United States Patent
Boerker

(10) Patent No.: US 7,349,449 B2
(45) Date of Patent: Mar. 25, 2008

(54) MULTIPLEXER CELL AND MULTIPLEXER CIRCUIT ARRANGEMENT AND CODING DEVICE FOR USE IN A MULTIPLEXER CIRCUIT ARRANGEMENT OF THIS KIND

(75) Inventor: Philipp Boerker, Berlin (DE)

(73) Assignee: Infineon Technologies AG, Munich (DE)

( * ) Notice: Subject to any disclaimer, the term of this patent is extended or adjusted under 35 U.S.C. 154(b) by 1190 days.

(21) Appl. No.: 10/256,455

(22) Filed: Sep. 27, 2002

(65) Prior Publication Data

US 2003/0058896 A1  Mar. 27, 2003

(30) Foreign Application Priority Data

Sep. 27, 2001  (DE) .............................. 101 47 643

(51) Int. Cl.
*H04J 3/02* (2006.01)
(52) U.S. Cl. ...................... 370/537; 370/538
(58) Field of Classification Search ................ 370/535, 370/537, 539, 532, 428, 497, 517, 518, 423, 370/419, 358, 359, 386, 540, 543, 538
See application file for complete search history.

(56) References Cited

U.S. PATENT DOCUMENTS 5,818,366 A * 10/1998 Morley ........................ 341/101
6,999,407 B2 * 2/2006 Moon .......................... 370/215

FOREIGN PATENT DOCUMENTS

DE  43 05 677 A1  8/1993
DE  199 52 370 A1  5/2001

OTHER PUBLICATIONS

Tanabe, et al., *IEEE Journal of Solid-State Circuits*, Vo. 36, No. 6, pp. 988-996 (Jun. 2001).

*Primary Examiner*—Brenda Pham
(74) *Attorney, Agent, or Firm*—Peter F. Corless; Steven M. Jensen; Edwards Angell Palmer & Dodge LLP

(57) ABSTRACT

A multiplexer cell (1) for converting an input signal ($D_0$, $D_1$) with a data input rate ($f_D$) into an output signal (E) with a data output rate ($f_E$), which in particular is twice the size of the data input rate, is proposed. For this purpose the multiplexer cell (1) according to the invention has a clock input connection (6) for supplying a clock signal ($C_0$), the frequency of which is the same as the data input rate ($f_D$), a first and a second data input connection (2, 4) for supplying a first or second input signal ($D_0$, $D_1$) at the data input rate ($f_D$), a data output connection (6) for the output of the output signal (E) at the data output rate ($f_E$), a first and a second master-slave register circuit (22, 24), the inputs of which are connected to the first or second data input connection (2, 4) and the clock inputs of which are connected to the clock input connection (6), for the flank controlled output of the first or second input signal ($D_0$, $D_1$), a delay circuit (18) the input of which is connected to the output of the second master-slave register circuit (24) and the clock input of which is connected to the clock input connection (6), for the delayed output of the second input signal ($D_1$), wherein the delay is half a clock period of the clock signal ($C_0$) and an XOR gate circuit (20), the first input of which is connected to the output of the first master-slave register circuit (22), the second input of which is connected to the output of the delay circuit (18) and the output of which is connected to the data output connection (8).

\* cited by examiner

16 Claims, 7 Drawing Sheets

MULTIPLEXER CELL AND MULTIPLEXER CIRCUIT ARRANGEMENT AND CODING DEVICE FOR USE IN A MULTIPLEXER CIRCUIT ARRANGEMENT OF THIS KIND

TITLE OF THE INVENTION

The present invention relates to a multiplexer cell which converts several input signals with a specific data input rate into an output signal with a data output rate, which, corresponding to the number of input signals, is higher than the data input rate. The present invention further relates to a multiplexer circuit arrangement with one or more multiplexer cells of this kind and a coding device, in particular for use in a multiplexer circuit arrangement of this kind, for converting level-coded input data into flank-coded output data.

Such multiplexer circuit arrangements are often used in semi-conductor technology, in order to combine comparatively slow data streams into fewer, faster data streams, for faster transfer of data.

One object of the present invention is to provide a multiplexer cell which enables generation of high data output rates and also requires less power consumption and is simple to implement.

This object is achieved by a multiplexer cell with the features of patent claim 1. Advantageous configurations and further developments of the multiplexer cell are defined in dependent claims 2 to 7.

In addition, a coding device for converting level-coded input data into flank-coded output data with the features of claim 8 is proposed, which is additionally preferably configured according to claim 9.

In addition the above object is achieved by a multiplexer circuit arrangement with the features of patent claim 10. Advantageous configurations and further developments of this multiplexer circuit arrangement are cited in subordinate claims 11 to 19.

The multiplexer cell according to the present invention has a clock input connection for supplying a clock signal and at least one first data input connection for supplying a first input signal at a specific data input rate and also a second data input connection for supplying a second input signal at the same data input rate, wherein the data input rate is the same as the frequency of the clock signal. At a data output connection of the multiplexer cell an output signal is output with a data output rate which is higher than, in particular twice the size of, the data input rate or the clock signal. The multiplexer cell further has a first and a second register circuit, the inputs of which are connected to the first and/or second data input connection and the clock inputs of which are connected to the clock input connection, for flank-controlled output of the first and/or second input signal. Finally, a delay circuit, the input of which is connected to the output of the second register circuit and the clock input of which is connected to the clock input connection, for the delayed output of the second input signal, and a logic circuit, the first input of which is connected to the output of the first register circuit, the second input of which is connected to the output of the delay circuit and the output of which is connected to the data output connection, are provided. The delay of the delay circuit is in particular half a clock period of the clock signal and the logic circuit is configured in such a way that each change in status at one of its inputs effects a change in status at its output, which can be achieved, for example, by configuring the logic circuit in the form of an XOR gate circuit.

Whereas conventional multiplexer cells require two clock signals, namely on the one hand a clock signal of the faster output signal and on the other hand a clock signal of half the frequency, in order to switch through one of the two inputs alternately in each case, the multiplexer cell according to the present invention requires only the clock signal of the lower frequency for the input signals and there is no necessity for the synchronicity of two clock signals. This enables the use of a clock generator with a lower power consumption, such as, for example, an asynchronous counter.

The delay circuit and the two register circuits are preferably realised by latch circuits, the clock inputs of which are connected to the clock input connection.

Owing to the flank-controlled through-switching of the two input signals by the two (master-slave) register circuits, in the preferred embodiment of the invention the data input connections of the multiplexer cell are connected to a coding device, which converts input data with a level coding into coded output data with a flank coding, which are then supplied to the data input connections of the multiplexer cell as input signals. The coding device is therein configured in such a way that the logical change effected by the logic circuit is entirely abolished.

With the aid of the above-described multiplexer cell, multiplexer circuit arrangements can be simply constructed. According to the invention multiplexer circuit arrangements of this kind have a data input for supplying input data at a data input rate and a data output for output of multiplexed output data at a data output rate, a clock generator for generating a clock signal, at least one of the above-described multiplexer cells, the data output connection of which is connected to the data output and the clock input connection of which is connected to the clock generator, a coding device, the input of which is connected to the data input and the output of which to the data input connections of the multiplexer cell, wherein the coding device converts input data with a level coding into coded output data with a flank coding.

For constructing 4:1, 8:1, 16:1 or higher multiplexers several multiplexer cells can be combined in a way known per se into a multiplexer unit in the form of a multi-stage tree structure, wherein the input connections of the multiplexer cells of the first stage are connected to the output of the coding device and the output connection of the multiplexer cell of the last stage to the data output of the multiplexer circuit arrangement.

As already previously explained, in the multiplexer circuit arrangement according to the invention a coding device is used, which converts input data with a level coding into coded output data with a flank coding. This coding device can, for example, be configured in such a way that in each case two adjacent bits of the input data are converted by exclusive-OR operation from the level coding into a flank-coded representation, wherein the resulting exclusive-OR signal is supplied to a so-called toggle register, which provides the respective bit of the flank-coded output data. In order to attain greater security against malfunction of the coding device, however, an, as it were, "reversed" circuit version of the coding device can also be used, wherein the level-coded input data are first supplied in each case to toggle registers, and wherein in each case the output signals of two toggle registers, corresponding to the two adjacent bits of the input data, are subjected to an exclusive-OR operation, in order thus to attain a corresponding bit of the flank-coded output data. Naturally, the coding device is not confined to use in a multiplexer circuit arrangement according to the invention, but in principle can be used anywhere where a conversion of level-coded input data into flank-coded output data is desired.

As already mentioned, by using the multiplexer cells according to the invention an asynchronous counter can advantageously be used as clock generator, the power consumption of which is lower than that of a synchronous counter. The asynchronous counter has an input connection for supplying a clock control signal and several output connections for output of the clock signals for the multiplexer cells of the individual stages of the multiplexer unit, wherein the frequency of the clock signals doubles from one stage of the multiplexer unit to the next stage.

The frequency of the clock control signal can correspond to the data output rate of the multiplexed output data, wherein in this case the frequency of the clock signal of the last stage of the multiplexer unit is the same as half the frequency of the clock control signal. Alternatively the frequency of the clock control signal can also correspond to half the data output rate of the multiplexed output data, wherein in this case the frequency of the clock signal of the last stage of the multiplexer unit is the same as the frequency of the clock control signal.

In order to guarantee greater clock accuracy of the output data of the multiplexer circuit arrangement, it is advantageous to clock the output of the multiplexer unit with a further clock control signal, the frequency of which is the same as the data output rate of the output data.

In a further, preferred embodiment of the multiplexer circuit arrangement two multiplexer units are provided, which are connected parallel and controlled via the common clock generator. The output of the second multiplexer unit is therein connected to a delay circuit, in order to delay the output data of the second multiplexer unit by half a clock period of the output data rate with respect to the output data of the first multiplexer unit. By this measure in a simple way, for example, an 8:1 multiplexer can be "enlarged" to a 16:1 or a 16:2 multiplexer.

Although the present invention is described using the preferred embodiment example of a 2:1 multiplexer cell with two data input connections and one data output connection, via which the output signal is output at a data output rate twice as high as the data input rate, the present invention is not confined to this embodiment example. In particular, the invention can also be applied to a larger number N of data input connections and/or input signals if the delay of the delay circuits of the second to nth data input connection is set in each case to a corresponding fraction of the clock period of the clock signal. The data output rate then corresponds to n times the data input rate.

The invention is described in greater detail below using a preferred embodiment example with reference to the attached drawings.

DETAILED DESCRIPTION OF THE INVENTION

Figure 1:
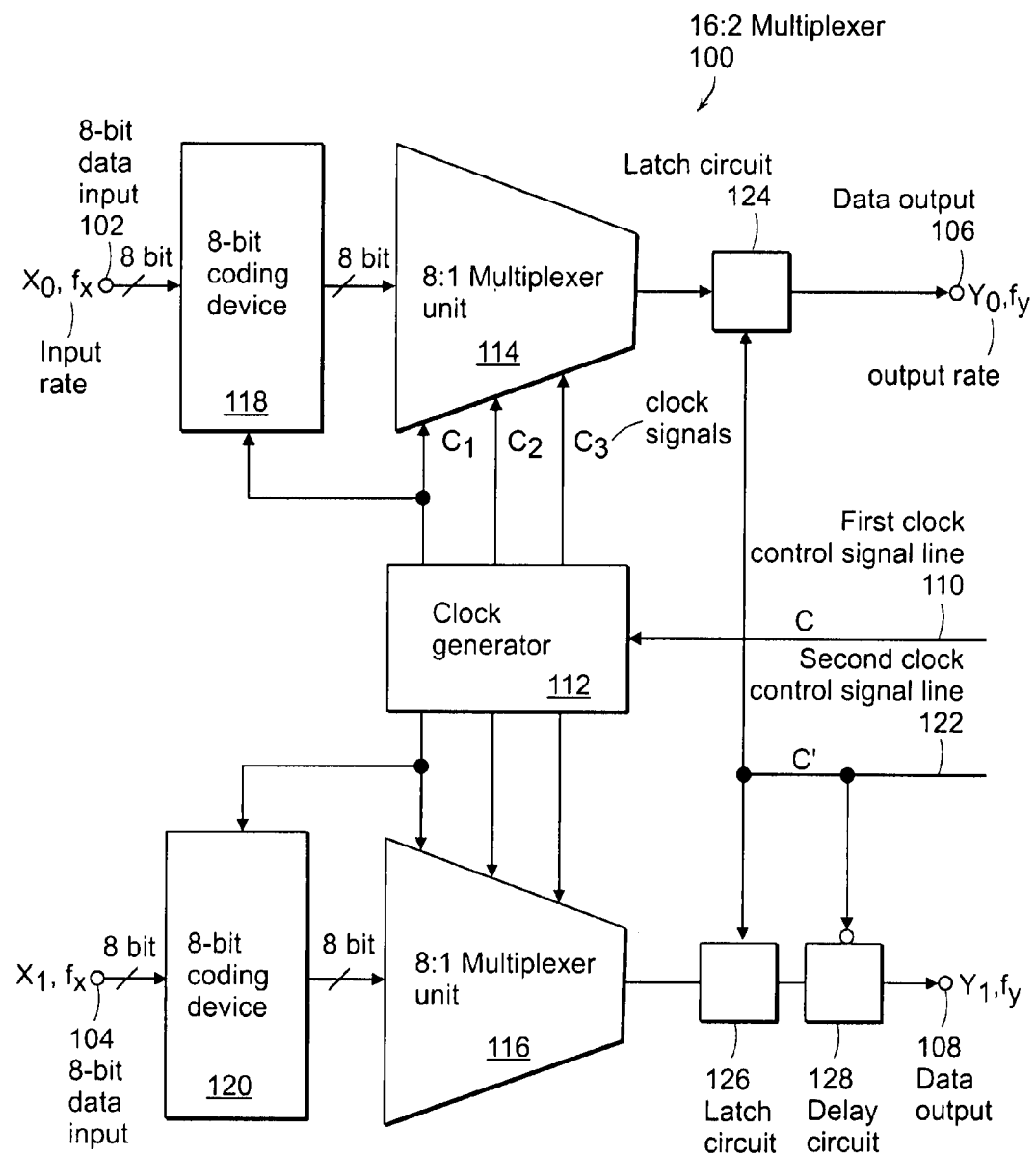
FIG. 1 shows a block diagram of a 16:2 multiplexer circuit arrangement, in which several multiplexer cells according to the present invention are implemented.

FIG. 1 shows a block diagram of a 16:2 multiplexer circuit arrangement as a preferred application of a multiplexer cell according to the present invention. Further multiplexer circuit arrangements, such as, for example, 4:1, 8:1, 8:2, 16:1 multiplexers, etc. can of course be constructed in the same way.

The construction of this multiplexer circuit arrangement 100 is described using FIG. 1; the individual components of this multiplexer circuit arrangement and their functioning are explained in greater detail with reference to FIGS. 2 to 6.

With the aid of the illustrated circuit arrangement 100, which can be part of a chip, 16 data channels with 622.5 M bit/s are combined into two data channels each with 5 G bit/s. The 16 data channels are applied as input data $X_0$ and $X_1$ (with 8 data channels in each case) at a data input rate $f_x$ of 622.5 M bit/s to the two 8-bit data inputs 102 and 104 of the multiplexer circuit arrangement 100.

Figure 5:
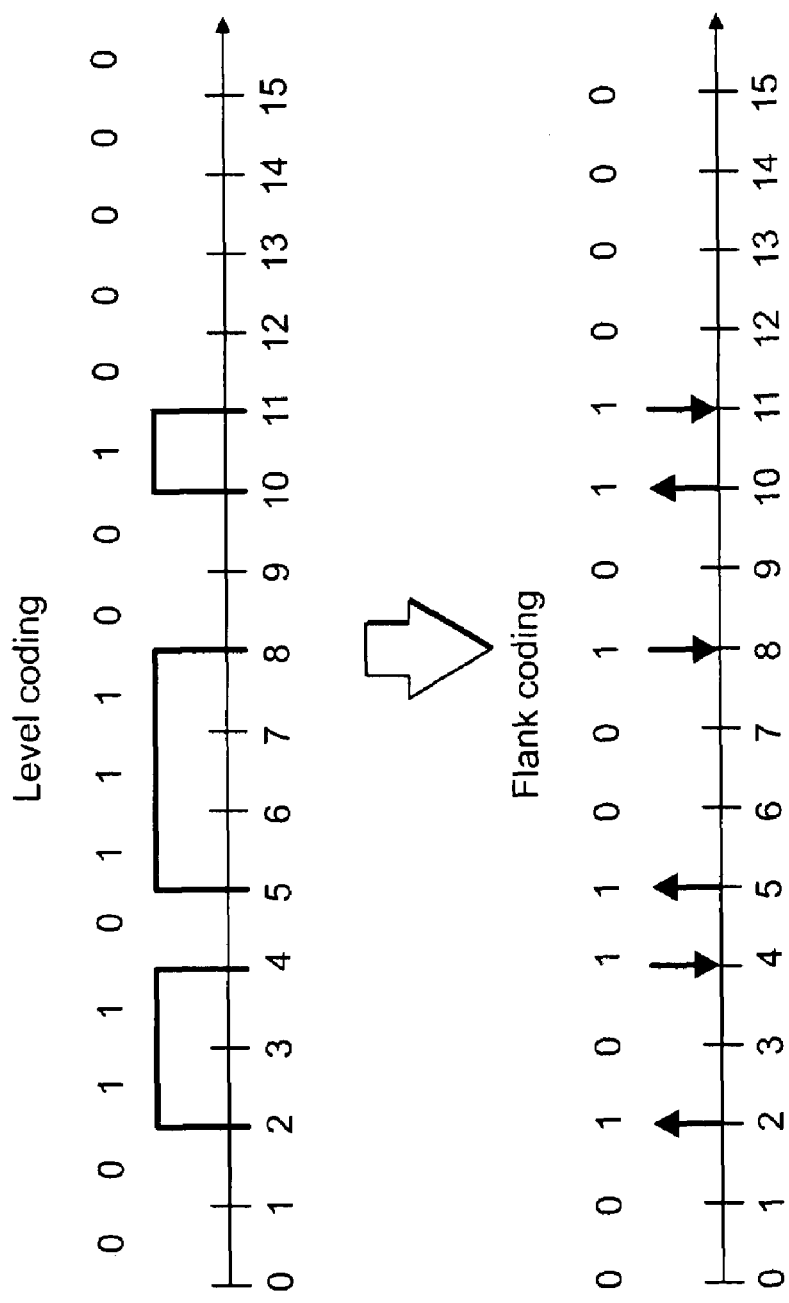
FIG. 5 shows a diagram to explain the functioning of the coding devices of the multiplexer circuit arrangement of FIG. 1.

The input data $X_0$, $X_1$ are in each case input into an 8-bit coding device 118, 120, in which the input data with level coding (i.e. logic 0/logic 1) are converted into a flank coding. A coding of this kind is schematically illustrated in FIG. 5. Each change of input data from logic 0 to logic 1 and in reverse causes a one in the coded input data; if, on the other hand, the input data value remains the same, i.e. if a 1 follows a 1 or a 0 follows a 0, a zero results in the coded input data. The coded input data word thus indicates which inputs have to occasion a change in the input signal. An ascending clock flank is indicated in each case by "↑" and a descending clock flank by "↓".

Figure 6:
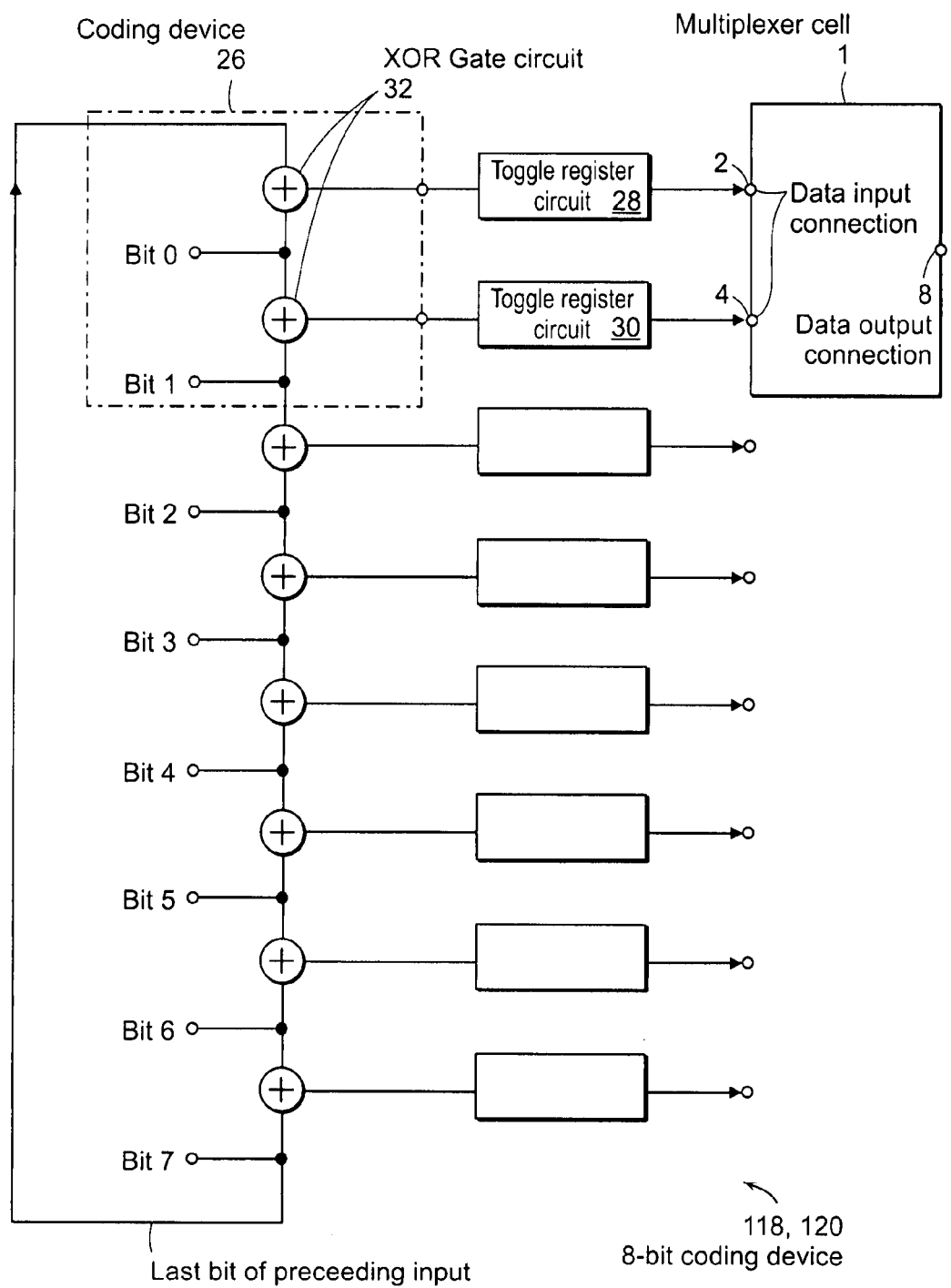
FIG. 6 shows a block diagram of a coding device of the multiplexer circuit arrangement of FIG. 1.

This coding takes place, for example, by means of simple XOR gate circuits 32, at the inputs of which adjacent bits of the input data word are applied, as illustrated in FIG. 6. For the first bit of the output data word of the coding device the first bit of the input data word and the last bit of the preceding input data word have to be referred back to. For this purpose the last bit of the input data word is temporarily intermediately stored in each case, indicated in FIG. 6 in the form of a loop starting from the last bit of the input data word.

Before the coded input data can be further processed, the outputs of the coding devices 118, 120 are connected to toggle register circuits 28, 30. Depending on its input value the toggle register circuit 28, 30 retains its value (toggle enable input=0) or inverts its value (toggle enable input=1). In this way the coding of the input data X is complete and the coded input data can be further processed.

As the coding takes place at the low clock rate $C_1$, which is the same as the data input rate $f_x$ of the multiplexer 100, coding of the input data X means only a low expenditure.

The coded 8-bit input data words are now supplied to the 8:1 multiplexer units 114, 116, by which they are converted into multiplexed 1-bit output data words Y with a higher data output rate $f_y$.

With the previously mentioned coding device 118, 120, shown in FIG. 6, in each case adjacent bits are converted in a first stage by an exclusive-OR operation from the level coding into the flank-coded representation. This establishes at what positions a change in the level of the output data stream must be occasioned. This change is triggered by the toggle register circuits 28, 30. Once a flank has been established, i.e. the corresponding output of an XOR gate circuit 32 is logic 1 (toggle enable input=1), the toggle register circuit connected downstream changes its value. This change of the stored value then effects the required change in the output level of the multiplexer 100.

This form of pre-coding of the input data is necessary for the functioning of the multiplexer 100. A problem associated with this, however, is that if one of the toggle register circuits 28, 30 does not switch over because of some sort of malfunction (e.g. because of the impact of an a particle, etc.), even though switchover of the corresponding toggle register circuit was supposed to take place, all the subsequent bits are output at the output of the multiplexer 100 as inverted. In this case the multiplexer 100 therefore from then on delivers only false output data. This problem can be overcome if, instead of the circuit version of the coding device 118, 120 shown in FIG. 6, an, as it were, "reversed" circuit version is used, as partially illustrated in FIG. 8.

Figure 7:
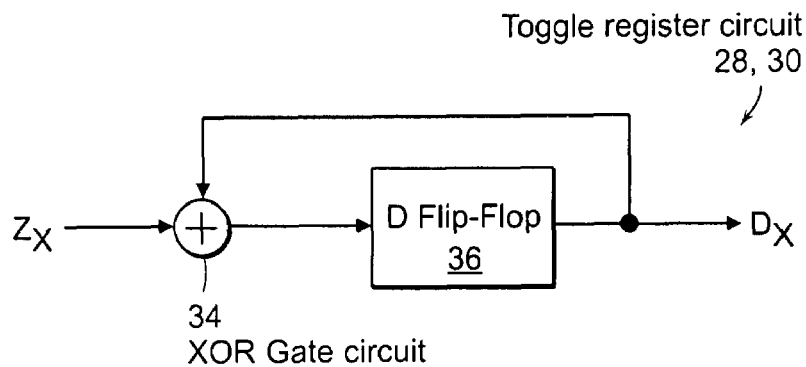
FIG. 7 shows a realisation of a toggle register circuit, typical in circuit technology, as can be used in the coding device shown in FIG. 6.
Figure 8:
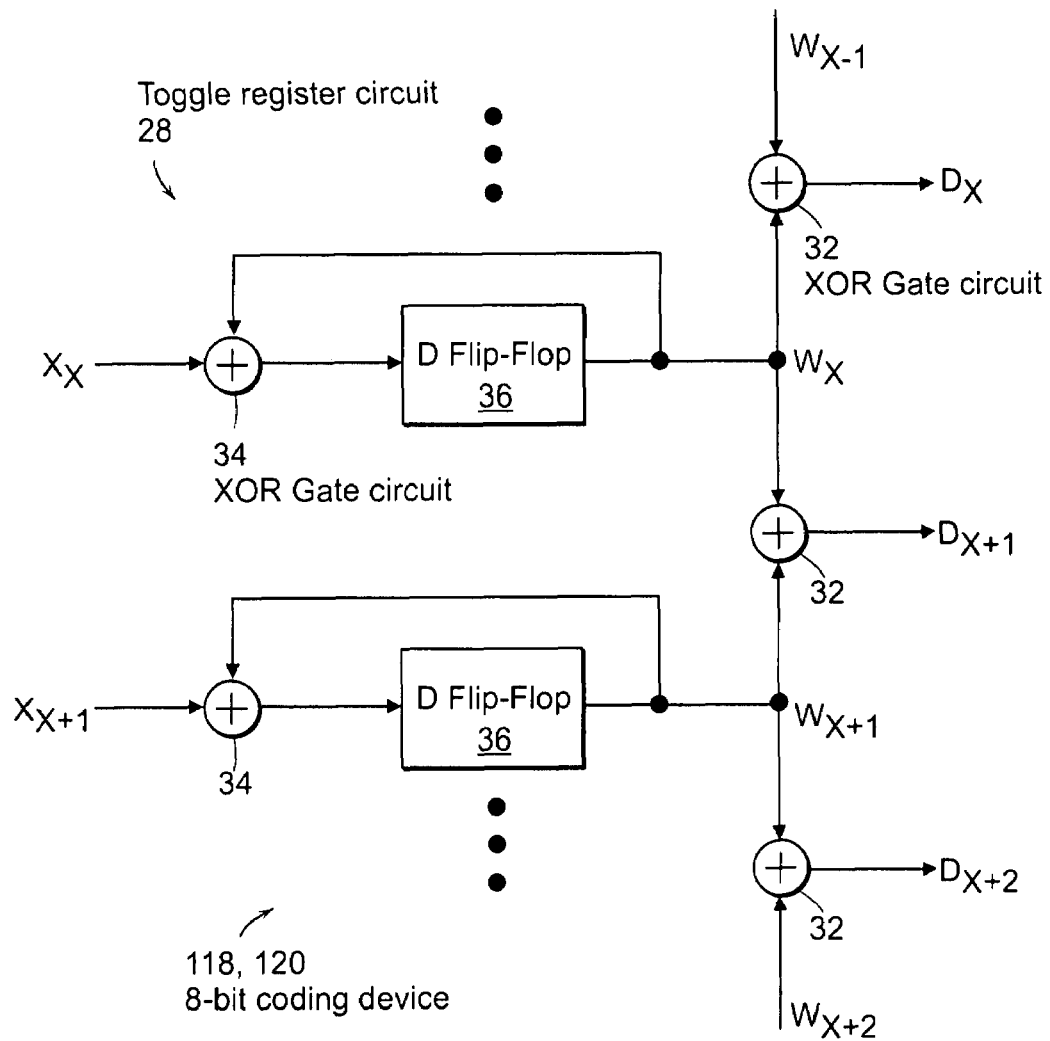
FIG. 8 shows a block diagram of an advantageous embodiment of a coding device of the multiplexer circuit arrangement of FIG. 1.

To derive the circuit version of the coding device 118, 120 shown in FIG. 8, the realisation, typical of circuit technology and illustrated in FIG. 7, of a toggle register circuit 28, 30, as used in the coding device 118, 120 shown in FIG. 6, should first be looked at. Reference numeral 34 therein designates in FIG. 6 an XOR gate circuit and reference numeral 36 designates a D flip-flop.

If the transfer function of the toggle register circuit 28, 30 illustrated in FIG. 7 is derived, the result is:

$$D_x^n = D_x^{n-1} \oplus Z_x^n \qquad (1)$$

therein designates an exclusive-OR operation, D the output and Z the toggle enable input of the toggle register circuit 28, 30. The subscript index designates the bit index or the bit position in the respective data word, while the superscript index gives the chronological order.

The above formula (1) corresponds to a series, which develops as follows:

$$D_x^1 = Z_x^1 \qquad (2)$$
$$D_x^2 = Z_x^2 \oplus Z_x^1$$
$$D_x^3 = Z_x^3 \oplus Z_x^2 \oplus Z_x^1$$
etc.

If it is taken into account that in the coding device 118, 120 shown in FIG. 6 the toggle enable inputs of the individual toggle register circuits 28, 30 are extracted in each case from respectively adjacent data bits by an exclusive-OR operation (with the aid of the XOR gate circuits 32), one obtains via this intermediate stage, with X as designation for the respective input data bit and Q as designation for the respective output data bit:

$$Z_x^n = X_x^n \oplus X_{x-1}^n \qquad (3)$$
$$D_x^1 = X_x^1 \oplus X_{x-1}^1$$
$$D_x^2 = (X_x^2 \oplus X_{x-1}^2) \oplus (X_x^1 \oplus X_{x-1}^1)$$
$$D_x^3 = (X_x^3 \oplus X_{x-1}^3) \oplus (X_x^2 \oplus X_{x-1}^2) \oplus (X_x^1 \oplus X_{x-1}^1)$$
etc.

As the exclusive-OR operation is commutative, this development can be converted as follows:

$$D_x^1 = X_x^1 \oplus X_{x-1}^1 \qquad (4)$$
$$D_x^2 = (X_x^2 \oplus X_x^1) \oplus (X_{x-1}^2 \oplus X_{x-1}^1)$$
$$D_x^3 = (X_x^3 \oplus X_x^2 \oplus X_x^1) \oplus (X_{x-1}^3 \oplus X_{x-1}^2 \oplus X_{x-1}^1)$$
etc.

The inter-relationships according to the above formula (4) can be realised by a circuit structure of the coding device 118, 120, as illustrated as an example in FIG. 8. In each case the following applies:

$$W_x^n = W_x^{n-1} \oplus X_x^n \qquad (5)$$
e.g. $W_x^3 = X_x^3 \oplus X_x^2 \oplus X_x^1$ etc.

In FIG. 8 again the necessary storing of the output bit $W_{m-1}$ of the highest value toggle register is not illustrated, wherein m designates the bit width of the data word to be coded. Analogously to the circuit structure of the coding device 118, 120 shown in FIG. 6 this bit is required to generate the output bit $D_0$ of the coding device.

The outputs $D_x$ of the coding device 118, 120 shown in FIG. 8 deliver the same logical combination of input bits $X_x$ as in the circuit shown in FIG. 6. With the coding device 118, 120 shown in FIG. 8, however, in principle the arrangement of the toggle register circuits 28, 30 and the XOR gate circuits 32 is reversed, i.e. the input bits are first supplied in each case to a toggle register circuit 28, 30, wherein in each case the signals and/or bits of the toggle register circuits 28, 30 assigned in the input data word to two adjacent bits are subjected to an exclusive-OR operation with the aid of an XOR gate circuit 32, in order to obtain a corresponding output bit of the coding device 118, 120. Thus, analogously to FIG. 6, there results an output bit $D_{x+1}$ by combination of input bits $X_x$ and $X_{x-1}$, wherein the output bit $D_0$ results from combination of input bits $X_{m-1}$ and $X_0$ (m again designates the bit width of the input and output data words with $0 \leq x \leq m-2$).

The "reversed" circuit version of the coding device realised according to FIG. 8 has a fundamental advantage. If one of the toggle register circuits 28, 30 stores a false value, owing to some kind of malfunction, in the circuit version shown in FIG. 8 two outputs of the coding device 118, 120 are simultaneously affected by this. This means that the malfunction causes precisely two adjacent "false" flanks, wherein the term "false" flank designates a flank which appears in the output data stream, although no such flank should have occurred there (or in reverse). Thus only one single false output bit can be generated by an error in a toggle register circuit. In the circuit version shown in FIG. 6, in the case of an even number of simultaneously occurring errors in the toggle register circuits also only a temporary adulteration of the output data stream would result. With an uneven number of simultaneously occurring errors in the toggle register circuits, on the other hand, all the subsequent bits would be inverted and thus adulterated. In the circuit version illustrated in FIG. 8 in all cases an even number of errors is generated at the outputs of the coding device 118, 120, so the multiplexer 100 can still function properly even after the occurrence of errors in the toggle register circuits 28, 30.

Figure 4:
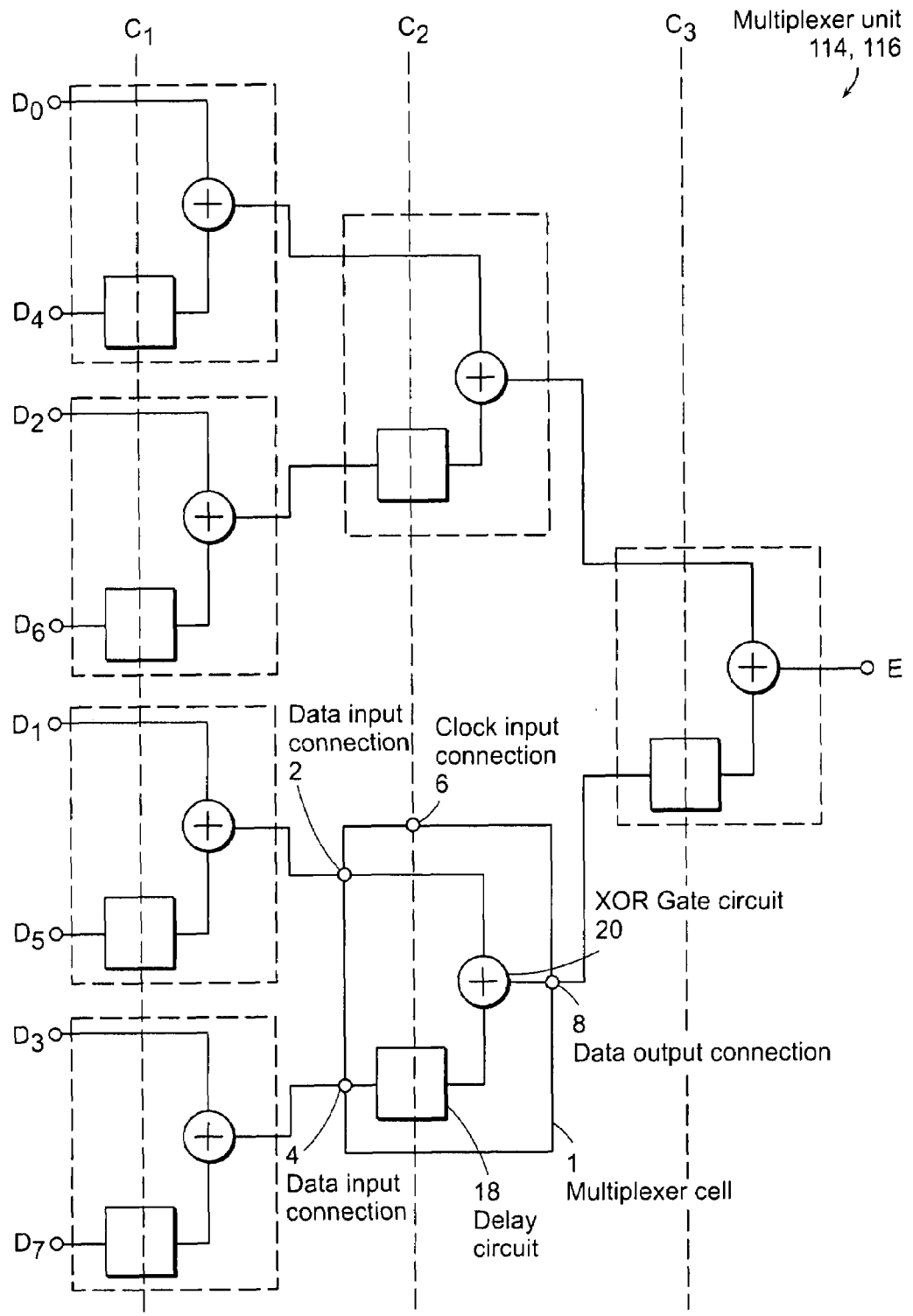
FIG. 4 shows a block diagram of a multiplexer unit which is constructed of several of the multiplexer cells illustrated in FIG. 2 and is part of the multiplexer circuit arrangement of FIG. 1.

As illustrated in FIG. 4, the two multiplexer units 114, 116 shown in FIG. 1 consist substantially of seven multiplexer cells 1 in each case, combined in a way known per se in the form of a multi-stage tree structure. The 8:1 multiplexer unit 114, 116 illustrated in FIG. 4 has in total seven multiplexer cells 1 in three stages, which can be clocked with the clock signals $C_1$, $C_2$ and $C_3$. As each individual multiplexer cell 1 converts a 2-bit input signal $D_0$, $D_1$ with a data input rate $f_D$ into a 1-bit output signal E with a data output rate $f_E$, which is twice the size of $f_D$, with the aid of the multiplexer unit 114, 116 illustrated 8-bit input signals $D_0$, $D_1$, . . . $D_7$ with a data input rate $f_D$ can be converted into 1-bit output signals E with a data output rate $f_E$, which is eight times the size of $f_D$.

The 8:1 multiplexer unit 114, 116 of FIG. 4 requires three clock signals $C_1$, $C_2$ and $C_3$, supplied to it by the individual stages of a clock generator 112. Owing to the special structure of the multiplexer cells 1 according to the invention an asynchronous counter can be used as clock generator 112, the power consumption of which is considerably lower than with synchronous counters.

A clock control signal C is supplied via a first clock control signal line 110 to the clock generator 112 at a clock rate of 5 GHz, corresponding to the data output rate $f_y$ of the multiplexer 100. The clock generator 112 converts the clock control signal in stages into the three clock signals $C_3$, $C_2$ and $C_1$, wherein the clock rate of C to $C_3$ to $C_2$ to $C_1$ is halved in each case (i.e. $C_3$=2.5 GHz, $C_2$=1.25 GHz, $C_1$=622.5 MHz).

An asynchronous counter normally consists of cascaded elements, which halve a clock in each case. If a clock signal is applied to the input of an element, a clock signal of exactly half the speed is thus generated at the output. The output clock can be divided again and in this way any number of clock divider ratios $2^n$ obtained. In the embodiment example shown in FIG. 1 a clock division takes place by means of $2^3$=8. Consequently, in the asynchronous counter three such dividers have been connected in series. As only the first element of the asynchronous counter has to be able to produce the high clock rate of 5 GHz, the next stages can be constructed with slower, more power-saving stages. This is not the case with the synchronous counter, which is why the asynchronous counter shows a lower power consumption.

The asynchronous counter has one decisive disadvantage compared with the synchronous counter, however. The delay which arises between input and output of the individual stages is by nature dependent on process fluctuations, changes in voltage, temperature, etc. and cannot be stopped. Because of the cascading of the dividers the individual delays further accumulate, which does not allow a fixed relationship between the individual outputs of the asynchronous counter. With a synchronous counter, on the other hand, all changes take place simultaneously at the individual outputs, simplifying the construction of the actual multiplexer.

With conventional multiplexer circuit arrangements the individual multiplexer cells required in each case two clock rates, which had to be adequately synchronous to one another over the entire parameter range, which only the synchronous counter can guarantee. On the other hand, the multiplexer cells of the present invention require in each case only the one lower clock rate of the input signals. Therefore the relationship of the individual outputs of the counter is no longer so important, which is why the asynchronous counter can now in fact be used as clock generator 112.

As the greatest required clock rate $C_3$ of, for example, 2.5 GHz is only half the size of the clock rate of the clock control signal C supplied to the clock generator 112, in an alternative embodiment of the multiplexer circuit arrangement 100 it is also possible to supply to the clock generator 112 a clock control signal C with a clock rate of, for example, 2.5 GHz, which is half the size of the data output rate $f_y$ of, for example, 5 Ghz, and to make this clock control signal available undivided to the last stage of the multiplexer unit 114, 116. With this embodiment the power consumption of the clock generator 112 is even less, as the fastest stage for dividing the clock from 5 GHz to 2.5 GHz is dispensed with.

Figure 2:
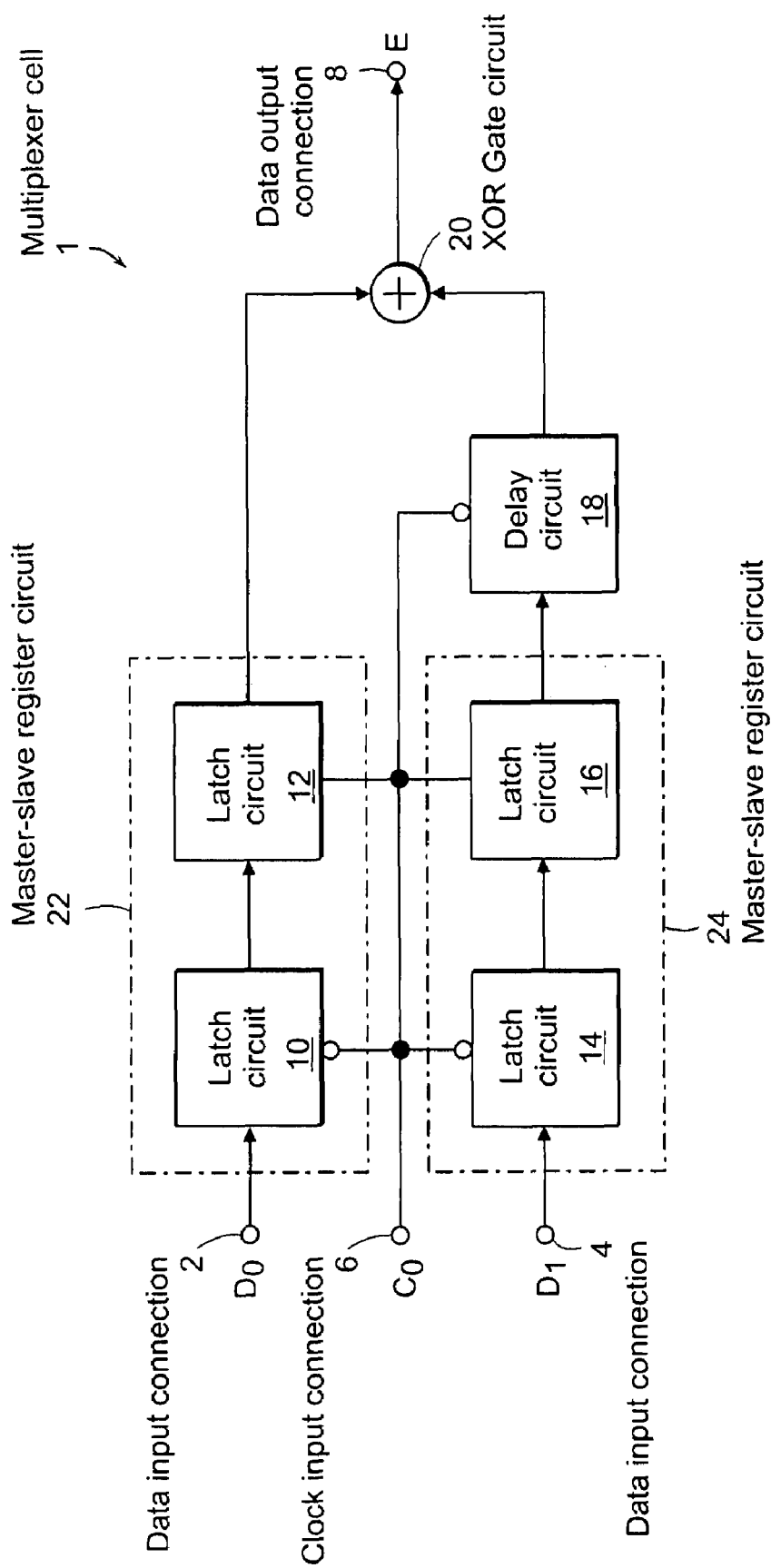
FIG. 2 shows a block diagram of a preferred embodiment example of a multiplexer cell according to the present invention.
Figure 3:
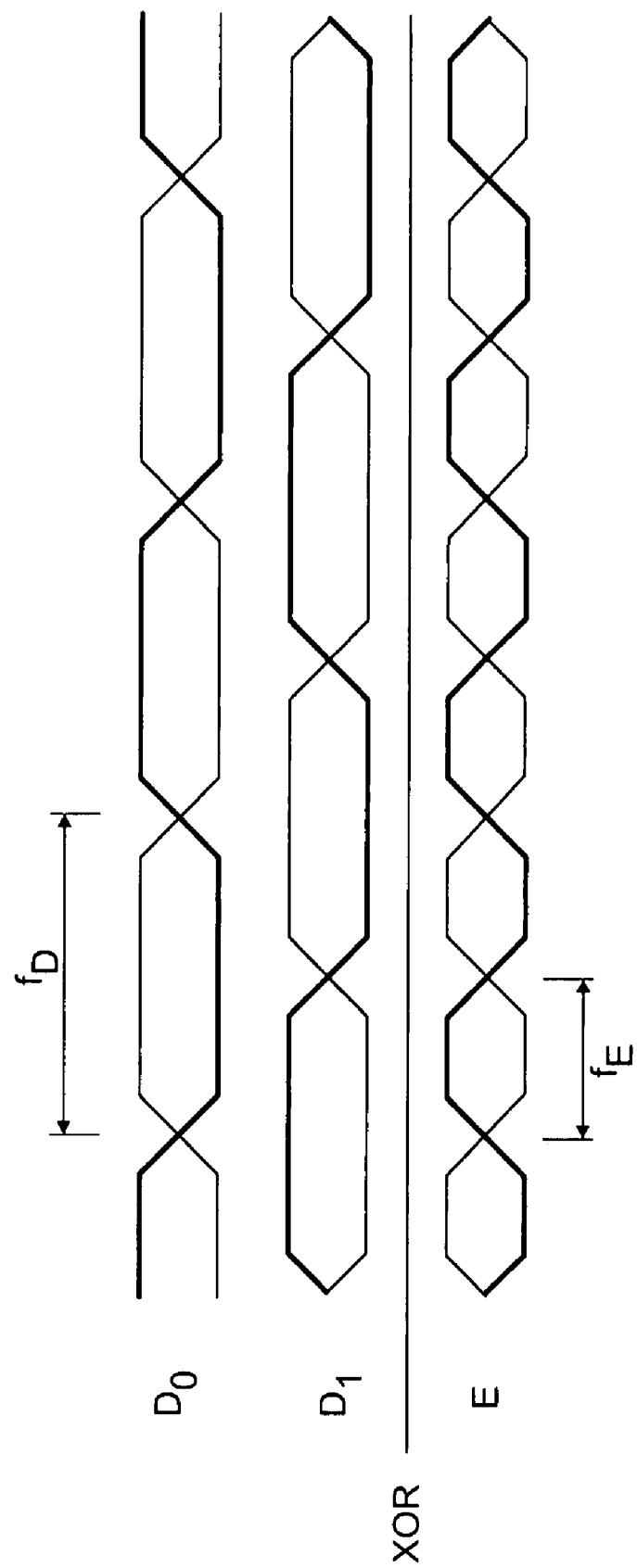
FIG. 3 shows a signal diagram to explain the functioning of the multiplexer cell of FIG. 2.

Using FIGS. 2 and 3, the structure of the actual multiplexer cell 1 which enables the use of an asynchronous counter as clock generator with the above described, is now explained.

The multiplexer cell 1, which converts a 2-bit input signal $D_0$, $D_1$ with a data input rate $f_D$ into a 1-bit output signal E with a data output rate $f_E$=2 $f_D$, has two data input connections 2, 4 and one data output connection 8. Additionally the multiplexer cell 1 has a clock input connection 6, via which a clock signal $C_D$ with a clock rate the same as the data input rate $f_D$ is supplied by the clock generator 112. Depending on the stage in the multiplexer unit 114, 116 this clock signal $C_D$ corresponds to the clock signal $C_1$, $C_2$ or $C_3$ of, for example, 622.5 MHz, 1.25 MHz or 2.5 GHz.

The input signal $D_0$, supplied via the first data input connection 2, is supplied to a first master-slave register circuit 22. The master-slave register circuit 22 is, for example, constructed of two latch circuits 10 and 12 connected in series, wherein the clock input of the first latch circuit 10 is inverted. The latch circuits are cells which, depending on their clock input, through-load the binary value at their input on to the output (clock input=1) or else keep the value last applied to the output (clock input =0). The master-slave register circuit 22, constructed of two such latch circuits 10, 12 in the way illustrated, stores the binary value applied to the input as flank-controlled. This means that the binary value applied to the input at the time of an ascending clock flank, is through-loaded on to the output. In this way the time span in which it is decided what kind of value is through-loaded on to the output is minimal.

The second input signal Di is also supplied to a master-slave register circuit 24, which, like the first master-slave register circuit, is constructed of two latch circuits 14 and 16, connected in series, with differently orientated clock inputs. However, connected downstream to the second master-slave register circuit 24 there is also a delay circuit 18, which can preferably also be formed from a latch circuit with inverted clock input. This delay circuit 18 delays the appearance of the output value of the second master-slave register circuit 24 by half a clock.

The multiplexer cell 1 according to the invention contains as last element an XOR gate circuit 20, one input of which is connected to the output of the first master-slave register circuit 22 and the other input of which is connected to the output of the delay circuit 18. The output of the XOR gate circuit 20 always changes its status if precisely one of its inputs changes its status. This inter-relationship is depicted in the signal course diagram of FIG. 3.

As the two inputs of the XOR gate circuit 20 alternately change in each case to the ascending or the descending flank of the clock signal $C_0$, each change of one of the two inputs always also entails an inversion of the output of the XOR gate circuit 20. Although both inputs of the multiplexer cell 1 therefore change only at half the data rate of the data output rate $f_E$, because of the chronological delay of the second input signal $D_1$ in the above-described way by half a clock, an output signal E, the data output rate $f_E$ of which is twice the size of the data input rate $f_D$, can still be generated.

As the status at the data output connection 8 of the multiplexer cell 1 always depends on both input signals $D_0$ and $D_1$, the input signals are previously flank-coded in the above-described way by the coding devices 118, 120.

Again referring to FIG. 4, two data input connections 2, 4 are always combined by means of a multiplexer cell 1. The data output connections 8 of the multiplexer cells 1 are again combined in pairs in the next stage. As the first stages of the multiplexer unit 114, 116 process smaller data rates than the last stages, they can be constructed by a more power-saving, slower technique. This reduces the power consumption, as already in the case of the asynchronous counter 112.

Since, as explained above using FIG. 2, one branch in the multiplexer cells 1 is always delayed by half a clock, in the case of the 8:1 multiplexer units 114, 116 illustrated in FIG. 4 there always emerge eight different delays for the different paths of the eight data input connections to the one data output connection. It should therein be noted that the lower branch of the last multiplexer cell is delayed by half a clock of $C_3$, in other words by one bit length, the delaying branches of the next stage on the other hand delay by half a clock of the halved clock rate $C_2$, in other words by two output bit lengths and the delaying branches of the first stage delay by half a clock of the clock rate $C_1$, in other words by a total of four output bit lengths.

By means of the above-described structures of the coding devices 118, 120 and multiplexer units 114, 116, two 8:1 multiplexers connected parallel or one 16:1 multiplexer, as illustrated in FIG. 1, are obtained.

In order to guarantee high synchronicity of the data rates of the two output data $Y_0$ and $Y_1$, the outputs of the two multiplexer units 114, 116 are additionally clocked with a clock control signal C', the clock rate of which (e.g. 5 GHz) is the same as the data output rate $f_y$. This clock control signal C' is preferably supplied via a second clock control signal line 122, as the load on the two latch circuits 124, 126 serving as drivers, via which the output data are clocked in this way, is very high.

Additionally the output data $Y_1$ of the second 8:1 multiplexer unit 116 are delayed by half a clock compared to the output data $Y_0$ of the first 8:1 multiplexer unit 114. This delay takes place by means of a delay circuit 128, which can preferably be constructed in the form of a latch circuit with inverted clock input. If the two data outputs 106, 108 are combined, a 16-bit output data word with a data rate of $2f_y$ is obtained.

The invention claimed is:

1. A multiplexer cell for converting input signals with a data input rate into an output signal with a data output rate which, based on the number of input signals, is higher than the data input rate comprising:
   a clock input connection for supplying a clock signal;
   a first data input connection for supplying a first input signal at the data input rate and at least one second data input connection for supplying a second input signal at the data input rate, wherein the data input rate is the same as the frequency of the clock signal;
   a data output connection for the output of the output signal at the data output rate which is higher than the data input rate;
   a first register circuit the input of which is connected to the first data input connection and the clock input of which is connected to the clock input connection for the flank-controlled output of the first input signal;
   a second register circuit the input of which is connected to the at least one second data input connection and the clock input of which is connected to the clock input connection for the flank-controlled output of the second input signal;
   a delay circuit the input of which is connected to the output of the second register circuit and the clock input of which is connected to the clock input connection for the delayed output of the second input signal; and
   a logic circuit with a first logic input connected to the output of the first register circuit and with a second logic input connected to the output of the delay circuit, and with a logic output to the data output connection, wherein the logic circuit is configured in such a way that each change in status at one of the first or second logic input leads to a change in status at its logic output.

2. The multiplexer cell according to claim 1, wherein the delay circuit is a latch circuit, the clock input of which is inverted to the clock input connection.

3. The multiplexer cell according to claim 1, wherein each of the first and second register circuits is a master-slave register circuit, the master-slave register circuit comprising:
   a first and second latch circuits connected in series, each of the first and second latch circuits having separate clock inputs connected to the clock input connection, the separate clock inputs in different orientation.

4. The multiplexer cell according to claim 1, wherein the multiplexer cell has one second data input connection, and the data output rate of the output signal output via the data output connection is twice the size of the data input rate of the first or second input signal supplied to the first or second data input connection, and the delay of the delay circuit corresponds to half the clock period of the clock signal.

5. The multiplexer cell according to claim 1, wherein the logic circuit has an XOR functionality.

6. The multiplexer cell according to claim 1, further comprising:
   a coding device, which converts input data with a level coding into coded output data with a flank coding, wherein the coded output data is supplied to the first and at least one second data input connections as input signals.

7. The multiplexer cell according to claim 6, further comprising:

a toggle register circuit provided between the coding device and the first and at least one second data input connections.

8. A multiplexer circuit arrangement comprising:
a data input for the input of input data at a data input rate and a data output for the output of multiplexed output data at a data output rate;
a clock generator for generating a clock signal;
the multiplexer cell according to claim 1, the data output connection of which is connected to the data output and the clock input connection of which is connected to the clock generator; and a coding device the input of which is connected to the data input and the output of which is connected to the data input connections of the multiplexer cell, wherein the coding device converts input data with a level coding into coded output data with a flank coding.

9. The multiplexer circuit arrangement according to claim 8, further comprising a plurality of multiplexer cells combined into a multiplexer unit and forming a multi-stage tree structure having at least a first stage and a last stage, wherein the data input connections of the multiplexer cells of the first stage are connected to the output of the coding device and the data output connections of the multiplexer cell of the last stage are connected to the data output of the multiplexer circuit arrangement.

10. The multiplexer circuit arrangement according to claim 9, wherein the clock generator is an asynchronous counter, which has an input connection for supplying a clock control signal and a plurality of output connections for the output of the clock signals to the multiplexer cells in the multi-stage tree structure of the multiplexer unit, wherein the frequency of the clock signals doubles from one stage of the multiplexer unit to the next stage.

11. The multiplexer circuit arrangement according to claim 10, wherein the frequency of the clock control signal corresponds to the data output rate of the multiplexed output data and the frequency of the clock signal of the last stage of the multiplexer unit is the same as half the frequency of the clock control signal.

12. The multiplexer circuit arrangement according to claim 10, wherein the frequency of the clock control signal corresponds to half the data output rate of the multiplexed output data and the frequency of the clock signal of the last stage of the multiplexer unit, is the same as the frequency of the clock control signal.

13. The multiplexer circuit arrangement according to claim 10, wherein the clock signal of the first stage of the multiplexer unit, generated by the clock generator, has the same frequency as the data input rate of the input data and is also supplied to the coding device as clock signal.

14. The multiplexer circuit arrangement according to claim 9, wherein the output of the multiplexer unit is clocked with a further clock control signal, the frequency of which is the same as the data output rate of the output data.

15. The multiplexer circuit arrangement according to claim 9, further comprising:
a first and second multiplexer unit which are connected in parallel and are controlled via the common clock generator, and the output of the second multiplexer unit is connected to a main delay circuit in order to delay the output data of the second multiplexer unit by half a clock period of the output data rate with respect to the output data of the first multiplexer unit.

16. The multiplexer circuit arrangement according to claim 15, wherein the main delay circuit is a latch circuit, the clock input of which is inverted, wherein a clock control signal is supplied to the clock input, the frequency of which is the same as the output data rate.

* * * * *